June 12, 1945.    P. R. BEGG    2,378,279
ORTHODONTIC BAND CLAMP
Filed Sept. 18, 1942

Inventor
Percy Raymond Begg
By
Munn, Liddy & Glascum
Attorneys

Patented June 12, 1945

2,378,279

UNITED STATES PATENT OFFICE 2,378,279

ORTHODONTIC BAND CLAMP

Percy Raymond Begg, Springfield, South Australia, Australia

Application September 18, 1942, Serial No. 458,761
In Australia October 24, 1941

3 Claims. (Cl. 32—14)

This invention relates to a tooth band clamp which has been so designed that it may be used on all teeth wherever a band is to be used for any purpose.

With orthodontic bands as used heretofore it was customary to chiefly use two types namely a welded band with arch bracket for the anterior teeth and a clamp with arch tube for the posterior teeth, the latter simply comprising a clamping band having a screwed stem whereby it could be pulled onto the posterior teeth and the arch fixed thereto, the former comprising an arch-holding bracket secured to bands which were placed around the teeth and after fitting were removed and welded or soldered and were then fixed in position by cementing. Alternatively a seamless band was used.

In the methods used heretofore a certain amount of difficulty was present in the fitting of the bands whether seamless or otherwise to the teeth, and the bands were also uncomfortable to the wearer in that there were a certain number of projections with which the tongue could contact, namely a shaft ferrule and nut on the ordinarily used molar clamp band, and the welded or soldered joints on the band of the anterior teeth when the seamless bands were not used. There was also the disadvantage of the time taken in fitting the bands in that in the case of welded bands the bands used had first of all to be pulled around teeth at their correct locality whereupon the band was removed and the two ends soldered and, after cementing the tooth, the band was again driven back into position. In the case of the seamless band, which had to be selected, fitted and cemented, the fit could not be made as accurate as desired on the gum margins.

The object of my invention is to provide a band clamp which is not open to the disadvantages mentioned above, and with this object in view I utilize a clamp arranged to engage a band which is so associated with the clamp that such band may be pulled tight around a tooth and locked in such position by the clamp which is then rigidly supported by the band, the clamp having means whereby it may be locked to an arch.

By means of the above described arrangement the clamp is held by the band which may be simply placed upon the teeth so that fitting of the band prior to its placing into position finally is eliminated, the band being placed in position and tightened up in the one operation, leaving the clamping member ready to be secured upon an arch, or the clamp or band to be used in any other connection.

In order however that the invention may be more clearly understood embodiments of same will now be described with reference to the accompanying drawing in which.

Figures 6, 13:
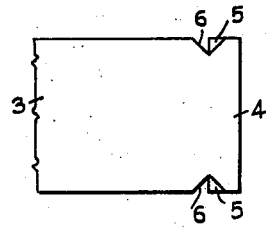
Fig. 6 is an elevation of the one end of the band.

The clamp shown in Figs. 1 to 4 comprises a body member 1 having in it a slot 2 through which the two ends of the band 3 pass, the slot being shown with a slight curvature to accommodate a band of similar shape, this shape ensuring a better marginal fit of the band on the teeth when the band is pulled tight. The slot and band need not be curved. The slot 2 is of sufficient width to neatly take a double thickness of band, the band being threaded through such slot until its one end is adjacent the slot, the band being bent around and then having the other end also placed through the slot forward of the first said end which I will refer to as the fixed end. The fixed end 4 is provided with means whereby it is prevented from pulling right through the slot, which means can conveniently comprise corners 5 turned back after making a cut along the line 6 indicated in Fig. 6. Other forms of fixing this end of the band to the clamp can of course be devised such as welding or soldering the band thereto, but the arrangement shown is usually preferred in that it enables ready replacement of the band, so that the clamp can be used again and again without subjecting it to heat to undo soldering or welding.

The free end 7 of the band projects through the slot 2 and tightening of the band around the tooth is effected by means of tension applied to this end, the clamp preferably being used as the reaction point of the pliers or the like by means of which the band is pulled tight.

Locking of the band 3 within the slot 2 of the clamp 1 is effected by means of a screw 9 located in a threaded aperture in the clamp.

The space forward of the screw 9 includes a slot 10 which is of a size to take the arch to which the clamp is anchored for the purpose of moving the tooth, the screw 11 serving to lock the arch in the slot 10.

Figure 5:
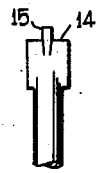
Fig. 5 shows the end of the screw-driver used in connection with the screw of the clamp.

The screws 9 and 11 are provided with the usual screw-driver slots 12 and also with a central aperture 13, this being for the purpose of enabling the screw to be held on the screw-driver which as shown in Fig. 5, is provided with flanges 14 which engage in the slot 12 and also with a projecting circular member 15 which engages in the aperture 13.

Figure 4:
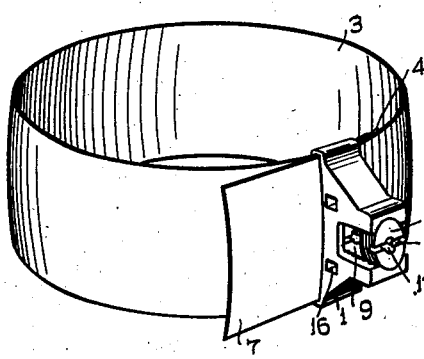
Fig. 4 is a perspective view showing the clamp and band.

In operation the band 3, placed through the clamp 1 as shown in Fig. 4, is located around the tooth, only the screw 9 being in position and that being moved back so that it does not contact with the band. The band is now tightened on the tooth by pulling the free end 7, and when sufficient tension has been applied the screw 9 is screwed home to bear tightly against the band and clamp same in position. The free end of the band is then cut off and the clamp will be found to be securely mounted upon the tooth by means of the locked band, the operation of fitting thus not requiring welding or any other manipulation. The arch is placed into the slot 10 and the screw 11 inserted to bear against the arch and lock that to the bracket.

The apertures 16 are for the purpose of enabling ligatures or arms to be attached when the clamp is to be used for revolving a tooth or for similar process. When revolving a tooth it may not be necessary to attach the bracket to the arch by means of the slot 10 and screw 11.

Figure 1:
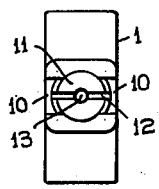
Fig. 1 is a front elevation of a clamp constructed according to my invention, the clamp including means for attaching it to an arch.
Figure 2:
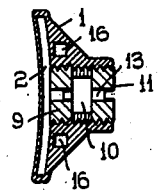
Fig. 2 is a central section of same.
Figure 7:
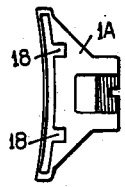
Fig. 7 is a side elevation of a modified form of clamp.
Figure 8:
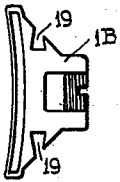
Fig. 8 is a similar view of a further modification.
Figure 3:
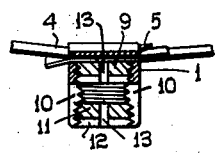
Fig. 3 is a sectional plan of same but showing the ends of a band held therein.

The embodiment shown in Fig. 7 differs only from that just described in that the apertures 16 are replaced by slots 18 formed in the body 1 of the clamp, while the embodiment shown in Fig. 8 utilizes wedge-shaped slots 19 opening outwardly from the clamp 1.

Figure 9:
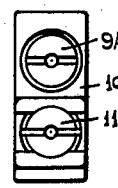
Fig. 9 is a front elevation of a clamp in which the holding screws are differently arranged.
Figure 10:
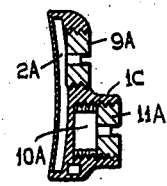
Fig. 10 is a sectional elevation of same.

According to the arrangement shown in Figs. 9 and 10 the screws 9A and 11A are positioned side by side and not axially as in the previously described embodiment, the slot 2A being provided in the clamp 1C as before, the arch being held in the slot 10A associated with the screw 11A.

Figures 11, 12:
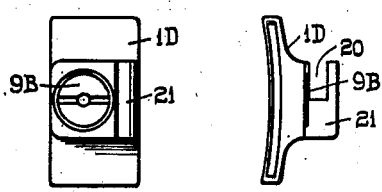
Fig. 11 is a front elevation of a clamp having a modified form of arch-holding socket.
Fig. 12 is a side elevation of Fig. 11.

In the arrangement shown in Figs. 11 and 12 only the screw 9B, corresponding to the screw 9 first described, is used, the clamp being held in a slot 20 formed in a projection 21 located to one side of the screw 9B, the clamp 1B again however serving the same function.

While in the foregoing various embodiments have been described it will be realised that other modifications or uses can be effected within the spirit of the invention.

What I claim is:

1. An orthodontic band clamp comprising; a member to form the clamp and hold one end of the band, a slot in the member through which the other end of the band can be pulled, a slot to support an arch, a screw-threaded aperture through the arch-holding slot to the band-holding slot, a screw in the aperture to clamp the band in its slot, and a screw in the aperture to clamp the arch in its slot.

2. An orthodontic band clamp comprising; a member to form the clamp, a slot in the member to accommodate two thicknesses of the band, a slot to support the arch, a screw-threaded aperture through the arch-holding slot to the band-holding slot, a screw in the aperture to clamp the band in its slot, and a screw in the aperture to clamp the arch in its slot.

3. An orthodontic band clamp comprising; a member to form the clamp and hold one end of the band, a slot in the member through which the other end of the band can be pulled, a screw in the member to clamp the band in the slot, a slot and screw to attach the clamp to an arch, and a screw-driver slot and central aperture in each of the screws.

PERCY RAYMOND BEGG.